(12) United States Patent
Sakiyama et al.

(10) Patent No.: US 8,040,168 B2
(45) Date of Patent: Oct. 18, 2011

(54) CHARGE PUMP CIRCUIT

(75) Inventors: Shiro Sakiyama, Kyoto (JP); Yusuke Tokunaga, Osaka (JP); Shiro Dosho, Osaka (JP); Toru Iwata, Osaka (JP); Takashi Hirata, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/188,855

(22) Filed: Jul. 26, 2005

(65) Prior Publication Data

US 2006/0097772 A1 May 11, 2006

(30) Foreign Application Priority Data

Nov. 5, 2004 (JP) ................................ 2004-322083

(51) Int. Cl.
*H03L 7/06* (2006.01)
*G05F 3/02* (2006.01)
(52) U.S. Cl. ......... 327/157; 327/148; 327/536; 327/537
(58) Field of Classification Search .................. 327/157, 327/148, 536, 537
See application file for complete search history.

(56) References Cited

U.S. PATENT DOCUMENTS

| | | | | |
|---|---|---|---|---|
| 5,247,241 A * | 9/1993 | Ueda | | 323/312 |
| 5,465,061 A | 11/1995 | Dufour | | |
| 5,532,636 A * | 7/1996 | Mar et al. | | 327/543 |
| 5,727,037 A | 3/1998 | Maneatis | | |
| RE36,013 E * | 12/1998 | Lee | | 327/536 |
| 5,929,678 A * | 7/1999 | Kasperkovitz et al. | | 327/157 |
| 5,986,487 A * | 11/1999 | Ridgers | | 327/157 |
| 6,054,882 A | 4/2000 | Izumikawa | | |
| 6,586,976 B2 | 7/2003 | Yang | | |
| 6,747,506 B1 * | 6/2004 | Thiara | | 327/537 |
| 6,897,733 B2 * | 5/2005 | Wakayama | | 331/17 |
| 7,161,401 B2 * | 1/2007 | Li | | 327/157 |
| 2004/0160268 A1 * | 8/2004 | Ozasa et al. | | 327/543 |
| 2005/0099214 A1 * | 5/2005 | Sasai | | 327/157 |

FOREIGN PATENT DOCUMENTS

| | | |
|---|---|---|
| JP | 07-075331 | 3/1995 |
| JP | 10-209858 | 8/1998 |
| JP | 11-088159 | 3/1999 |

(Continued)

OTHER PUBLICATIONS

Japanese Office Action, with English translation, issued in Japanese Patent Application No. 2004-322083, mailed May 26, 2009.

(Continued)

*Primary Examiner* — Lincoln Donovan
*Assistant Examiner* — Colleen O Toole
(74) *Attorney, Agent, or Firm* — McDermott Will & Emery LLP (57) ABSTRACT

The charge pump circuit includes: a first switch for controlling either one of push operation and pull operation based on a first control signal; a current mirror circuit composed of a transistor different in attribute from the first switch; and a second switch composed of a transistor same in characteristic as a transistor constituting the first switch, for controlling input of a current into the current mirror circuit based on a second control. The other operation, the push operation or the pull operation, is performed with a current output from the current mirror circuit.

3 Claims, 4 Drawing Sheets

FOREIGN PATENT DOCUMENTS

| | | | |
|---|---|---|---|
| JP | 2000-082954 | A | 3/2000 |
| JP | 2001-028539 | | 1/2001 |
| JP | 2001-111419 | | 4/2001 |
| JP | 2001101605 | A * | 4/2001 |
| WO | WO 03098807 | A1 * | 11/2003 |

OTHER PUBLICATIONS

Japanese Notice of Reasons for Rejection, w/ English translation thereof, issued in Japanese Patent Application No. JP 2004-322083 dated Oct. 13, 2009.

* cited by examiner

CHARGE PUMP CIRCUIT

CROSS-REFERENCE TO RELATED APPLICATIONS

This application claims priority under 35 U.S.C. §119 on Patent Application No. 2004-322083 filed in Japan on Nov. 5, 2004, the entire contents of which are hereby incorporated by reference.

BACKGROUND OF THE INVENTION

The present invention relates to a charge pump circuit, and more particularly, to a charge pump circuit suitable for feedback systems such as phase locked loop (PLL) circuits and delay locked loop (DLL) circuits.

Figure 7:
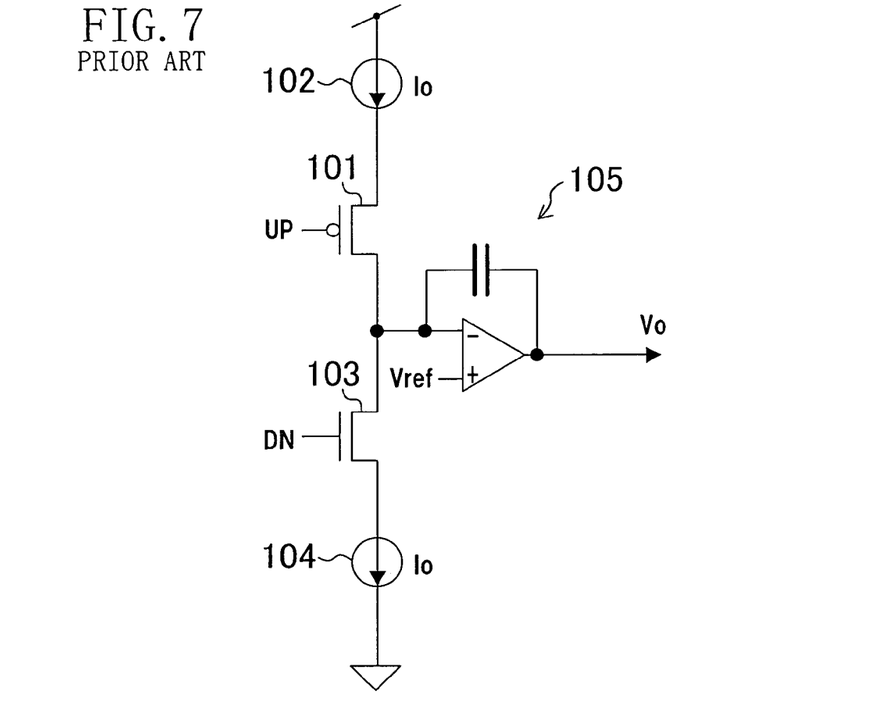
FIG. 7 is a view showing a configuration of a conventional charge pump circuit.

In general, in feedback systems such as PLL circuits and DLL circuits, a charge pump circuit is used for generating a signal for controlling a voltage-controlled oscillator (VCO) and a voltage-controlled delay circuit (VCD). FIG. 7 shows a configuration of a conventional charge pump circuit. When a signal UP is activated, a switch 101 is turned ON allowing a current to be supplied from a current source 102, to thereby implement "push" operation. When a signal DN is activated, a switch 103 is turned ON allowing a current to be drawn to a current source 104, to thereby implement "pull" operation. The current related to such "push-pull" operation is filtered with a low-pass filter 105, to generate a voltage Vo. The voltage Vo is used as a control signal for VCOs and VCDs (see Japanese Laid-Open Patent Publication No. 2000-82954 (page 6, FIG. 6), for example).

In control of switches in a charge pump circuit, switching noise occurs in a current flowing under the push-pull operation. This switching noise will be described with reference to FIG. 8.

A switch made of a pMOS transistor is taken as an example in this description. First, during the OFF period until the switch is turned ON, "feedthrough noise" occurs in which the charge in an output capacitance is released and moves toward the gate via a fringe capacitance and the like of the switch. Once the switch is turned ON, "injection noise" additionally occurs in which the charge in the output capacitance is released and moves toward the gate via a gate capacitance and the like of the switch (period shown by A in FIG. 8). Therefore, the output current is not immediately supplied to a load capacitance as the defined value Io, but is used for charging of the fringe capacitance and the gate capacitance for a while, and the remaining charge is supplied to the load capacitance (period shown by B in FIG. 8). If the current is not from an ideal current source, the output voltage value of the current source changes under the influence of ON resistance of the switch with the passage of time, and thus the current value continues failing to reach the defined value Io (period shown by C in FIG. 8).

Figure 8:
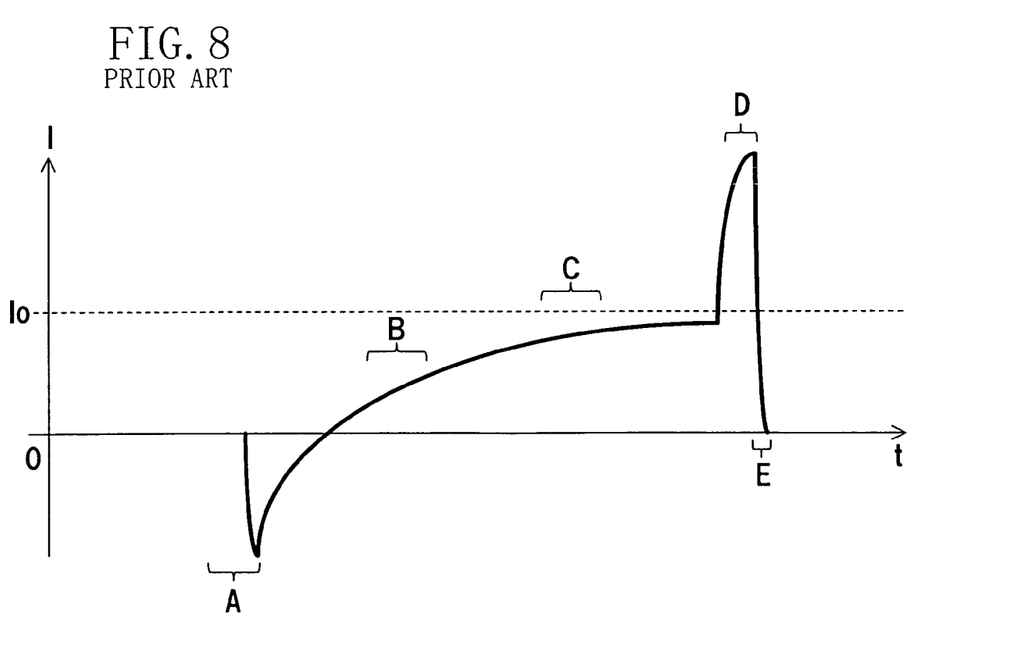
FIG. 8 is a graph of a switching noise-superimposed charge.

Upon turning OFF of the switch, the charges stored in the fringe capacitance, the gate capacitance and the like are output at one time (feedthrough noise and injection noise), and as a result the output current exceeds the defined value Io for a short time (period shown by D in FIG. 8). The feedthrough noise and the injection noise are then converged, so that the value of the output current is converged to zero (period shown by E in FIG. 8).

When a charge pump circuit is operated at high speed, a charge error caused by switching noise becomes too large to be neglected with respect to the charge moving under the push-pull operation. For example, assuming that the current source supplies a current of 5 µA and the charge pump circuit is operated at 250 MHz, the charge supplied with one time of switching is 5 f coulomb (C) (5 µA×1 ns). If the switch has a fringe capacitance of 1 fF, the charge caused by feedthrough noise occurring when the switch is operated at 4V is 4 fC (=4V×1 fF). In this case, therefore, the charge error caused by the noise is roughly the same in magnitude as the charge supplied from the current source. In other words, the charge moving under the push-pull operation of the charge pump circuit includes a considerable amount of noise-caused error.

In relation to the above, the following problem arises. That is, the noise-caused charge error differs among transistors different in attribute. In particular, n-channel transistors and p-channel transistors differ from each other in the relationship between the control voltages with which turning ON and OFF are determined and the threshold voltage of each transistor, and thus greatly differ from each other in the charge amount caused by charge injection noise. Considering the characteristics of transistors, it is virtually impossible to suppress occurrence of feedthrough noise and injection noise. Moreover, injection noise changes with variations of the power supply and the process. It is therefore extremely difficult to have an equal amount of switching noise for a p-channel transistor and an n-channel transistor. Therefore, in the conventional charge pump circuits, the switching noise is asymmetric due to the difference in attribute between the transistors, and thus it is virtually impossible to secure equilibrium between the charge formed with the push operation and the charge released with the pull operation.

SUMMARY OF THE INVENTION

An object of the present invention is providing a charge pump circuit in which equilibrium is secured between the charge formed with the push operation and the charge released with the pull operation.

To attain the above object, the charge pump circuit of the present invention is a charge pump circuit for performing push-pull operation based on first and second control signals, including: a first switch for controlling either one of push operation and pull operation based on the first control signal; a current mirror circuit including a transistor different in attribute from the first switch; and a second switch composed of a transistor identical in characteristic as a transistor constituting the first switch, for controlling input of a current into the current mirror circuit based on the second control signal, wherein the other operation, the push operation or the pull operation, is performed with an output current of the current mirror circuit.

According to the invention described above, either push operation or pull operation is controlled with the first switch, and the other operation is controlled with the second switch via the current mirror circuit. The first and second switches are composed of a transistor identical in characteristic, and thus generate switching noise of the same characteristic when they are switched. Hence, the charge formed with the push operation and the charge released with the pull operation include roughly the same amount of charge error caused by the switching noise. In this way, the charges related to the push operation and the pull operation are kept in equilibrium.

Preferably, the charge pump circuit further includes an operational amplifier for receiving a voltage at the output side of the current mirror circuit at its inverted input terminal and receiving a voltage at the input side of the current mirror circuit at its non-inverted input terminal.

According to the invention described above, the voltages at the input and output sides of the current mirror circuit are made equal to each other with action of a "virtual short circuit" of the operational amplifier. This improves the precision of the mirror ratio of the current mirror circuit and thus further improves the equilibrium of the charges related to the push operation and the pull operation. Also, the voltage generated at the input side of the current mirror circuit with operation of the second switch is directly supplied to the operational amplifier. This speeds up the response to the switching of the second switch and thus improves the frequency characteristic of the charge pump circuit.

Preferably, the current mirror circuit includes an operational amplifier for receiving a reference voltage at its inverted input terminal and receiving a voltage at the input side of the current mirror circuit at its non-inverted input terminal, and transistors on the input and output sides of the current mirror circuit receive a voltage output from the operational amplifier.

According to the invention described above, the voltage at the input side of the current mirror circuit is made equal to the reference voltage with action of a "virtual short circuit" of the operational amplifier. This stabilizes the voltage at the input side of the current mirror circuit, and thus enables stable current supply via the second switch.

Preferably, the charge pump circuit further includes: a first capacitance connected to the input side of the current mirror circuit; and a second capacitance having the same capacitance value as the first capacitance, for receiving a current related to the push-pull operation.

According to the invention described above, by setting the capacitance values of the first capacitance connected to the input side of the current mirror circuit and the second capacitance receiving a current related to the push-pull operation equal to each other, the noise immunity against variations in reference voltage and ground voltage improves.

Preferably, the first and second control signals are different in phase from each other, and the charge pump circuit further includes a current source commonly connected to the first and second switches.

According to the invention described above, in which the first and second switches share a common current source, the amounts of currents supplied in the push operation and the pull operation can be the same. Hence, the equilibrium of the charges related to the push operation and the pull operation further improves. In addition, since it is unnecessary to provide a current source for each switch, the circuit scale can be reduced.

Preferably, the first and second control signals are different in phase from each other, and the charge pump circuit further includes: a resistance commonly connected to the first and second switches at one end and receiving a first voltage at the other end; and an operational amplifier receiving a voltage at the output side of the current mirror circuit at its inverted input terminal and receiving a second voltage at its non-inverted input terminal.

According to the invention described above, a current flows through the resistance with a voltage difference between the first and second voltages, and the push-pull operation is performed based on this current. Since no current source is specifically required, the circuit scale can be reduced. In addition, the amounts of currents supplied in the push operation and the pull operation can be the same, and thus the equilibrium of the charges related to the push operation and the pull operation further improves.

According to the present invention, equilibrium is secured between the charge formed with the push operation and the charge released with the pull operation. Also, the switches for controlling the push operation and the pull operation are made of a transistor of the same type. That is, "one-sided" switching is implemented. This permits low voltage operation, and thus can reduce power consumption.

DESCRIPTION OF THE PREFERRED EMBODIMENTS

Hereinafter, preferred embodiments of the present invention will be described with reference to the accompanying drawings.

Embodiment 1

Figure 1:
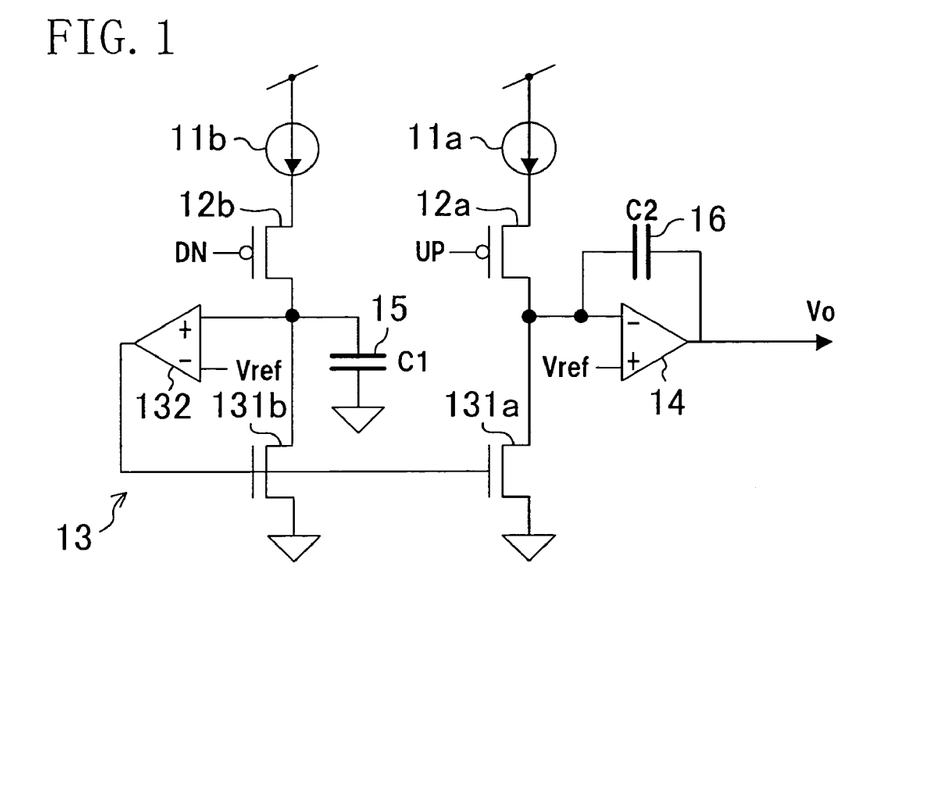
FIG. 1 is a view showing a configuration of a charge pump circuit of Embodiment 1 of the present invention.

FIG. 1 shows a configuration of a charge pump circuit of Embodiment 1 of the present invention. The charge pump circuit of this embodiment includes current sources $11a$ and $11b$, switches $12a$ and $12b$, a current mirror circuit 13 and an operational amplifier 14. A capacitance 15 is connected to the input side of the current mirror circuit 13, and a capacitance 16 is inserted on a negative feedback route of the operational amplifier 14.

The switch $12a$, made of a p-channel transistor, is controlled with a signal UP. Specifically, the switch $12a$ is turned ON when the signal UP is activated, to allow a current to be supplied from the current source $11a$ to the capacitance 16. When the signal UP is inactivated, the switch $12a$ is turned OFF to stop the current supply to the capacitance 16. That is, the switch $12a$ controls push operation of a current with respect to the capacitance 16.

The switch $12b$, made of a p-channel transistor like the switch $12a$, is controlled with a signal DN. Specifically, the switch $12b$ is turned ON when the signal DN is activated, to allow a current from the current source $11b$ to be input into the current mirror circuit 13. Note herein that the current value of the current source $11b$ is equal to that of the current source $11a$. When the signal DN is inactivated, the switch $12b$ is turned OFF to stop the current input into the current mirror circuit 13. That is, the switch $12b$ controls input of a current into the current mirror circuit 13.

The current mirror circuit 13 includes: n-channel transistors $131a$ and $131b$, different in attribute from the transistors of the switches $12a$ and $12b$, placed on the output and input sides thereof, and an operational amplifier 132 inserted between the drain and gate of the transistor $131b$. A reference voltage Vref is applied to the inverted input terminal of the operational amplifier 132, and the voltage at the input side of the current mirror circuit 13 is applied to the non-inverted input terminal thereof. The output terminal of the operational amplifier 132 is connected to the gates of the n-channel transistors 131a and 131b. The operational amplifier 132 operates so that the voltage at the input side of the current mirror circuit 13 becomes Vref. Also, the operational amplifier 132 amplifies the differential voltage between a voltage generated at the capacitance 15 with the current supplied from the current source 11b when the switch 12b is ON and the reference voltage Vref, and supplies the amplified output voltage to the gates of the n-channel transistors 131a and 131b. The current mirror circuit 13 having the above configuration draws in a current of the same magnitude as the input current at the output thereof as the output current.

The output of the current mirror circuit 13 is connected to the capacitance 16. The direction of the output current of the current mirror circuit 13 with respect to the capacitance 16 is opposite to the direction of the current supplied from the current source 11a under control of the switch 12a. In other words, the current is "pulled" with respect to the capacitance 16 with the output current of the current mirror circuit 13. Since the current input into the current mirror circuit 13 is controlled with the switch 12b as described above, the current pull operation with respect to the capacitance 16 is virtually controlled with the switch 12b.

The capacitance 15 is connected to the non-inverted input terminal of the operational amplifier 132, and operates as a filter. That is, the capacitance 15 stores charge with the current supplied from the current source 11b when the switch 12b is ON, and releases the stored charge when the switch 12b is OFF.

The reference voltage Vref is also applied to the non-inverted input terminal of the operational amplifier 14, and the operational amplifier 14 operates so that the voltage at the output side of the current mirror circuit 13 becomes Vref. The operational amplifier 14 operates as a low-pass filter together with the capacitance 16. With the operation of the operational amplifier 14 in cooperation with the operation of the operational amplifier 132 described above, the voltages at the input and output of the current mirror circuit 13 are made equal to each other. Thus, the precision of the mirror ratio of the current mirror circuit 13 improves, and as a result, the equilibrium of charges related to the push operation and the pull operation improves.

In the charge pump circuit having the above configuration, preferably, the switches 12a and 12b are made of p-channel transistors same in size and characteristics, so that the switches 12a and 12b have equal switching noise characteristics. As described above, in the charge pump circuit of this embodiment, the push operation is controlled with the switch 12a and the pull operation is controlled with the switch 12b. With the equal switching noise characteristics, therefore, the charge formed with the push operation and the charge released with the pull operation, including any charge error caused by switching noise, become equal to each other.

More preferably, the capacitance values of the capacitances 15 and 16 are set to be equal to each other. This improves power supply noise immunity against variations in reference voltage and ground voltage. Hereinafter, the power supply noise immunity of the charge pump circuit of this embodiment will be described in comparison with the conventional charge pump circuit.

First, response to a variation in reference voltage will be described. In the conventional charge pump circuit shown in FIG. 7, if the reference voltage Vref decreases by $\Delta V$, part of charge ($\Delta VCp$) stored in a parasitic capacitance (capacitance value Cp) at the connecting point between the switches 101 and 103 moves to the capacitance 16 (capacitance value C2), causing a change of the output voltage from Vo to Vox. In this case, the following relational expression is established from the principle of conservation of charge.

$$(Vref-Vo)C2+\Delta VCp=(Vref-\Delta V-Vox)C2$$

The above relational expression can be expanded, to obtain the following solution.

$$Vox=Vo-\Delta V-\Delta VCp/C2$$

Since the capacitance value C2 of the capacitance 16 is sufficiently larger than the capacitance value Cp of the parasitic capacitance (C2>>Cp), the third term of the right side of the above solution can be neglected. As a result, the following approximated solution is obtained.

$$Vox=Vo-\Delta V$$

As described above, in the conventional charge pump circuit, the variation in reference voltage presents itself as a variation in output voltage. In other words, the voltage difference Vo–Vss between the ground voltage Vss and the output voltage Vo changes with a variation in reference voltage if any. For this reason, the conventional charge pump circuit is considered vulnerable to a variation in reference voltage, that is, noise added to the reference voltage.

On the contrary, in the charge pump circuit of this embodiment, when the reference voltage Vref decreases by $\Delta V$, part of charge ($\Delta VCp$) stored in a parasitic capacitance (capacitance value Cp) at the connecting point between the switch 11a and the transistor 131a moves to the capacitance 16 (capacitance value C2), as in the conventional circuit. Further, in this embodiment, worthy of special mention is that since the reference voltage Vref applied to the operational amplifier 132 also decreases by $\Delta V$, part of charge ($\Delta VC1$) stored in the capacitance 15 (capacitance value C1) flows to the ground via the transistor 131b, and accordingly the transistor 131a draws in the same amount of charge ($\Delta VC1$) from outside, that is, from the capacitance 16. Assuming that the output voltage of the charge pump circuit changes from Vo to Vox as a result of the drawing, the following relational expression is established from the principle of conservation of charge.

$$(Vref-Vo)C2+\Delta VCp-\Delta VC1=(Vref-\Delta V-Vox)C2$$

The above relational expression can be expanded, to obtain the following solution.

$$Vox=Vo+\Delta V(C1-C2-Cp)/C2$$

Since the capacitance value C1 of the capacitance 15 and the capacitance value C2 of the capacitance 16 are individually sufficiently larger than the capacitance value Cp of the parasitic capacitance (C1>>Cp, C2>>Cp), the second term of the right side of the above solution can be neglected. If it is assumed that the capacitance values of the capacitances 15 and 16 are equal to each other (C1=C2), the following approximated solution is obtained.

$$Vox=Vo$$

As described above, in the charge pump circuit of this embodiment, it is found that by setting the same capacitance value for the capacitances 15 and 16, the output voltage is kept unchanged irrespective of a variation in reference voltage. In other words, the voltage difference Vo–Vss between the ground voltage Vss and the output voltage Vo does not change with a variation in reference voltage if any. For this reason, the charge pump circuit of this embodiment is considered resistant to a variation in reference voltage, that is, noise added to the reference voltage.

Next, response to a variation in ground voltage will be described. In the conventional charge pump circuit shown in FIG. 7, when the ground voltage Vss increases by $\Delta V$, part of charge (ΔVCp) stored in a parasitic capacitance (capacitance value Cp) at the connecting point between the switches 101 and 103 moves to the capacitance 16 (capacitance value C2), causing a change of the output voltage from Vo to Vox. In this case, the following relational expression is established from the principle of conservation of charge.

$$(Vref-Vo)C2 + \Delta VCp = (Vref-Vox)C2$$

The above relational expression can be expanded, to obtain the following solution.

$$Vox = Vo - \Delta VCp/C2$$

Since the capacitance value C2 of the capacitance 16 is sufficiently larger than the capacitance value Cp of the parasitic capacitance (C2>>Cp), the second term of the right side of the above solution can be neglected. As a result, the following approximated solution is obtained.

$$Vox = Vo$$

As described above, in the conventional charge pump circuit, the output voltage will not change with a variation in ground voltage. In other words, the voltage difference Vo−Vss between the ground voltage Vss and the output voltage Vo changes with a variation in ground voltage if any. For this reason, the conventional charge pump circuit is considered vulnerable to a variation in ground voltage, that is, noise added to the ground voltage.

On the contrary, in the charge pump circuit of this embodiment, when the ground voltage Vss increases by ΔV, part of charge (ΔVCp) stored in a parasitic capacitance (capacitance value Cp) at the connecting point between the switch 11a and the transistor 131a moves to the capacitance 16 (capacitance value C2), as in the conventional circuit. Further, in this embodiment, worthy of special mention is that since the ground voltage Vss applied to the current mirror circuit 13 also increases by ΔV, part of charge (ΔVC1) stored in the capacitance 15 (capacitance value C1) flows to the ground via the transistor 131b, and accordingly the transistor 131a draws in the same amount of charge (ΔVC1) from outside, that is, from the capacitance 16. Assuming that the output voltage of the charge pump circuit changes from Vo to Vox as a result of the drawing, the following relational expression is established from the principle of conservation of charge.

$$(Vref-Vo)C2 + \Delta VCp - \Delta VC1 = (Vref-Vox)C2$$

The above relational expression can be expanded, to obtain the following solution.

$$Vox = Vo + \Delta V(C1 - Cp)/C2$$

Since the capacitance value C1 of the capacitance 15 and the capacitance value C2 of the capacitance 16 are individually sufficiently larger than the capacitance value Cp of the parasitic capacitance (C1>>Cp, C2>>Cp), ΔV can be substituted for the second term of the right side of the above solution. If it is assumed that the capacitance values of the capacitances 15 and 16 are equal to each other (C1=C2), the following approximated solution is obtained.

$$Vox = Vo + \Delta V$$

As described above, in the charge pump circuit of this embodiment, by setting the same capacitance value for the capacitances 15 and 16, the variation in ground voltage presents itself as a variation in output voltage. In other words, when the ground voltage Vss varies, the output voltage Vo also varies by the same amount, and as a result, the voltage difference Vo−Vss between the ground voltage Vss and the output voltage Vo is kept constant. For this reason, the charge pump circuit of this embodiment is considered resistant to a variation in ground voltage, that is, noise added to the ground voltage.

In the above description, it was assumed that the capacitance values C1 and C2 of the capacitances 15 and 16 were equal to each other (C1=C2). These values are not necessarily precisely equal to each other. The effect of improving the noise immunity can be sufficiently obtained by giving roughly equal capacitance values for these capacitances.

As described above, in this embodiment, the charge formed with the push operation and the charge released with the pull operation, including any charge error caused by switching noise such as feedthrough noise and injection noise and leaks at switches such as gate induced drainbarrier lowering (GIDL), drain induced barrier lowering (DIBL) and gate leak, can be made equal to each other. In other words, in the charge pump circuit of this embodiment, such noise and leaks do not specifically adversely affect the equilibrium between the charge formed with the push operation and the charge released with the pull operation, and thus can be regarded as having been virtually cancelled. Also, the charge pump circuit of this embodiment is resistant to a variation in reference voltage and a variation in ground voltage, and thus excellent in noise immunity.

Also, in the conventional charge pump circuit, in which switching of two serially connected transistors different in channel type is controlled complementarily (see FIG. 7), the power supply voltage must be set at a comparatively high value in consideration of the amplitudes of the control signals for the transistors. On the contrary, in the charge pump circuit of this embodiment, in which the two transistors subjected to switching control are of the same channel type, the power supply voltage can be set low. In other words, the charge pump circuit of this embodiment is operable at a low voltage and thus the power consumption is comparatively small.

In the charge pump circuit of this embodiment, the equilibrium of the charges related to the push operation and the pull operation depends on the precision of the current ratio between the current sources 11a and 11b and the precision of the mirror ratio of the current mirror circuit 13. Such ratio precision can be improved by increasing the transistor size and other means, and thus the equilibrium of charges can be secured comparatively easily.

Figure 2:
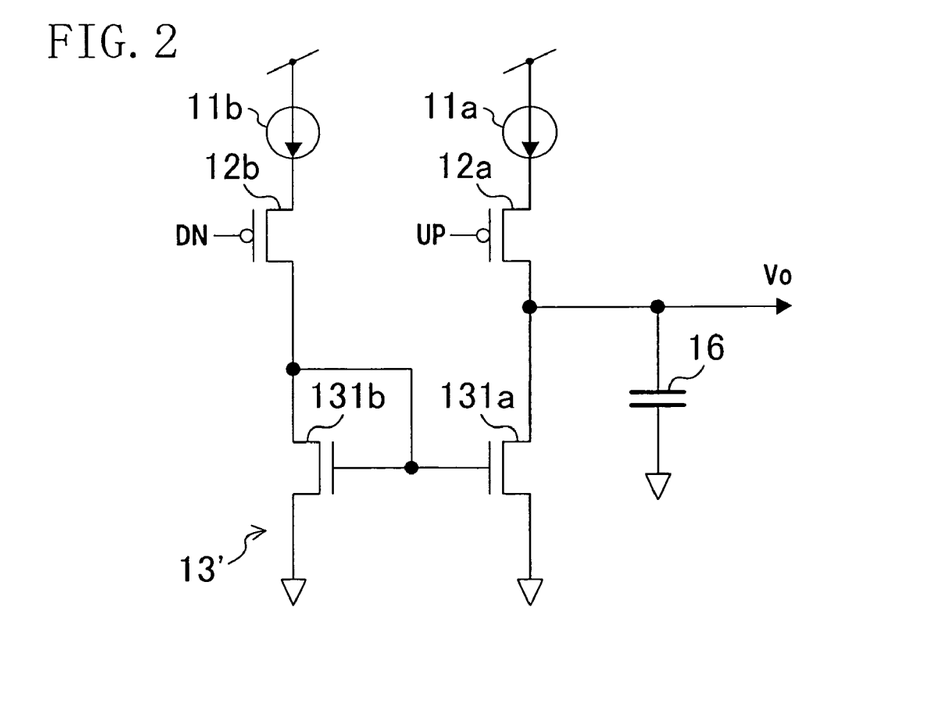
FIG. 2 is a view showing an alteration to the charge pump circuit of Embodiment 1 of the present invention.

The capacitance 15 may be omitted in the charge pump circuit of this embodiment. FIG. 2 shows an alteration to the charge pump circuit of this embodiment. In the charge pump circuit of this alteration, a current mirror circuit 13', composed of the n-channel transistors 131a and 131b, receives a pulsed signal generated with switching of the switch 12b and releases the charge in the capacitance 16 based on this signal. In this alteration, the current sources 11a and 11b must be as close to an ideal current source as possible, but since the operational amplifier 132 is unnecessary, the circuit scale can be reduced.

It is preferred to provide, in parallel with the switch 12a, a switch that is connected to the current source 11a at one terminal while receiving the reference voltage Vref at the other terminal and is controlled with a signal inverted from the signal UP, and also provide, in parallel with the switch 12b, a switch that is connected to the current source 11b at one terminal while receiving the reference voltage Vref at the other terminal and is controlled with a signal inverted from the signal DN. For example, when the signal UP is active, the switch 12a is ON allowing a current from the current source 11a to flow through the switch 12a, and thus a predetermined voltage is generated at the connecting point between the current source 11a and the switch 12a. When the signal UP is inactive, the switch placed in parallel with the switch 12a is ON allowing a current from the current source 11a to flow through this switch, and thus a predetermined voltage is generated at the connecting point between the current source 11a and the switch 12a. Therefore, the voltage at the connecting point between the current source 11a and the switch 12a is kept constant irrespective of the state of the signal UP, and this ensures stability of the current value supplied from the current source 11a when the switch 12a is turned ON. As a result, the push-pull operation of the charge pump circuit is stabilized.

Embodiment 2

Figure 3:
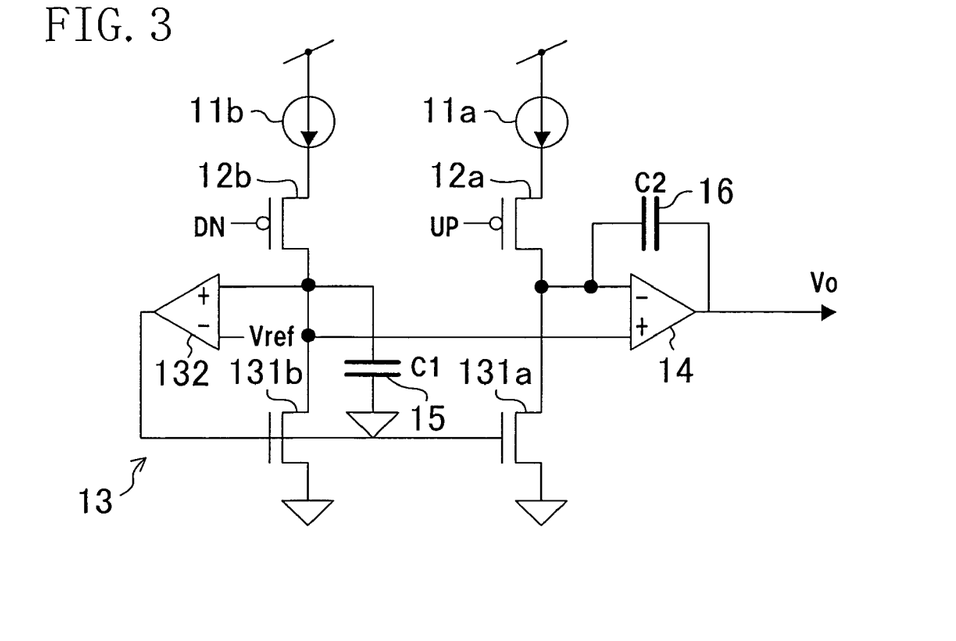
FIG. 3 is a view showing a configuration of a charge pump circuit of Embodiment 2 of the present invention.

FIG. 3 shows a configuration of a charge pump circuit of Embodiment 2 of the present invention. The charge pump circuit of this embodiment is different from the charge pump circuit of Embodiment 1 (see FIG. 1) in that the non-inverted input terminal of the operational amplifier 14 is connected to the input side of the current mirror circuit 13.

The operational amplifiers 132 and 14 have respective input offset voltages. Therefore, in the charge pump circuit of Embodiment 1, the voltages at the operation points on the input and output sides of the current mirror circuit 13 are not equal to each other in the strict sense. In this embodiment, the voltage at the input side of the current mirror circuit 13 is supplied to the non-inverted input terminal of the operational amplifier 14. Hence, the operational amplifier 14 operates to make the voltage at the output side of the current mirror circuit 13 equal to the voltage at the input side of the current mirror circuit 13 including the input offset voltage of the operational amplifier 132. This can eliminate the input offset voltage of the operational amplifier 132 that may otherwise be a cause of reduction in the precision of the mirror ratio of the current mirror circuit 13, and as a result, the equilibrium of the charges related to the push operation and the pull operation improves. In addition, since the voltage generated at the capacitance 15 is directly supplied to the operational amplifier 14, the response to the switching of the switch 12b is sped up, and this improves the frequency characteristic of the charge pump circuit.

As described above, in this embodiment, the equilibrium of the charges related to the push operation and the pull operation further improves. In addition, high-speed response is attained and thus the frequency characteristic of the charge pump circuit improves.

Figure 4:
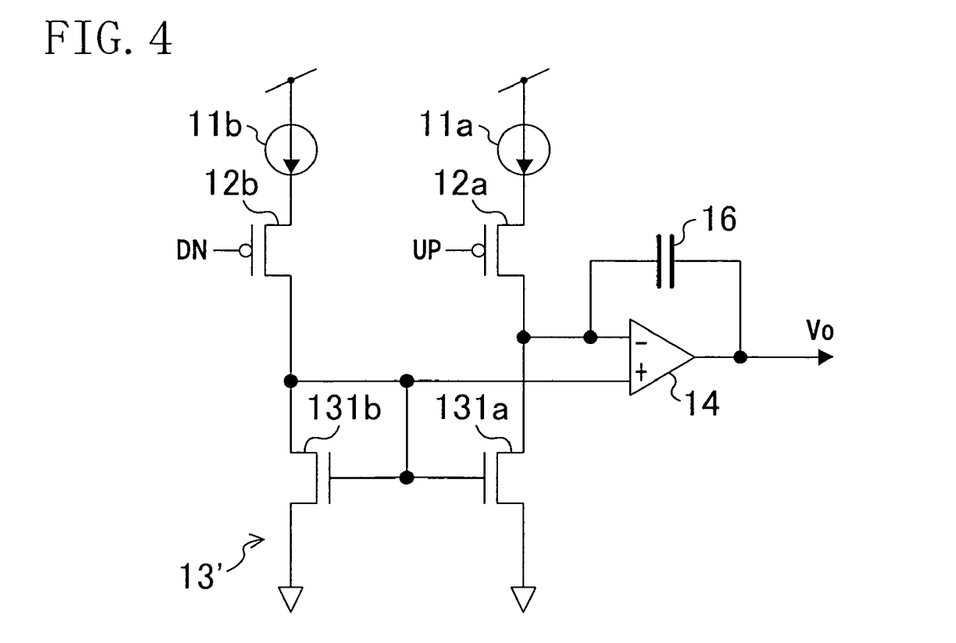
FIG. 4 is a view showing an alteration to the charge pump circuit of Embodiment 2 of the present invention.

The capacitance 15 may be omitted in the charge pump circuit of this embodiment. FIG. 4 shows an alteration to the charge pump circuit of this embodiment. In the charge pump circuit of this alteration, a current mirror circuit 13', composed of the n-channel transistors 131a and 131b, receives a pulsed signal generated with switching of the switch 12b and releases the charge in the capacitance 16 based on this signal. In this alteration, the current sources 11a and 11b must be as close to an ideal current source as possible, but since the operational amplifier 132 unnecessary, the circuit scale can be reduced.

Embodiment 3

Figure 5:
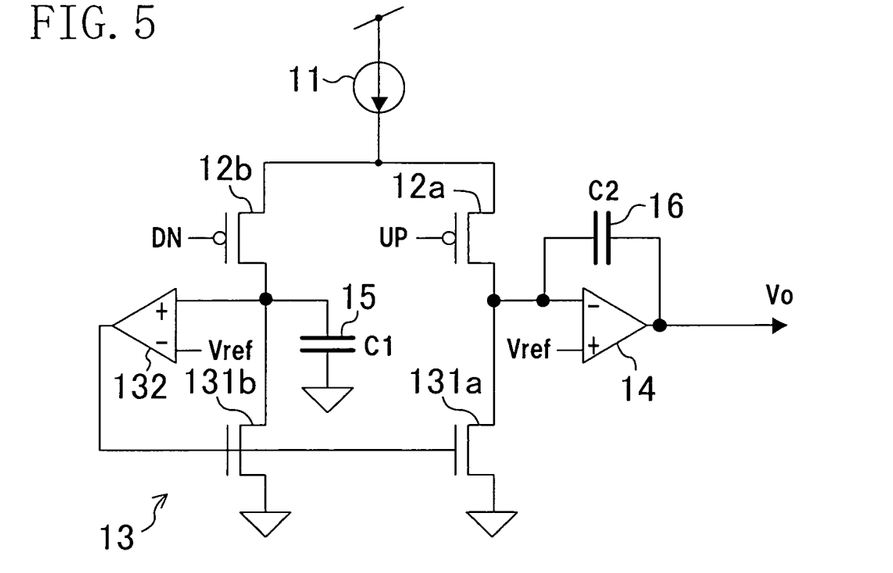
FIG. 5 is a view showing a configuration of a charge pump circuit of Embodiment 3 of the present invention.

FIG. 5 shows a configuration of a charge pump circuit of Embodiment 3 of the present invention. The charge pump circuit of this embodiment includes a current source 11 in place of the current sources 11a and 11b in the charge pump circuit of Embodiment 1 (see FIG. 1).

If it is assumed that one of the signals UP and DN is inactive when the other signal is active, one current source can be used for both the push operation and the pull operation. In the charge pump circuit of this embodiment, therefore, a current source 11 is commonly connected to the switches 12a and 12b. With this configuration, the same amount of current can be supplied for both the push operation and the pull operation, and thus the equilibrium of the charges related to the push operation and the pull operation further improves. In addition, since only one current source is necessary, the circuit scale can be reduced.

Embodiment 4

Figure 6:
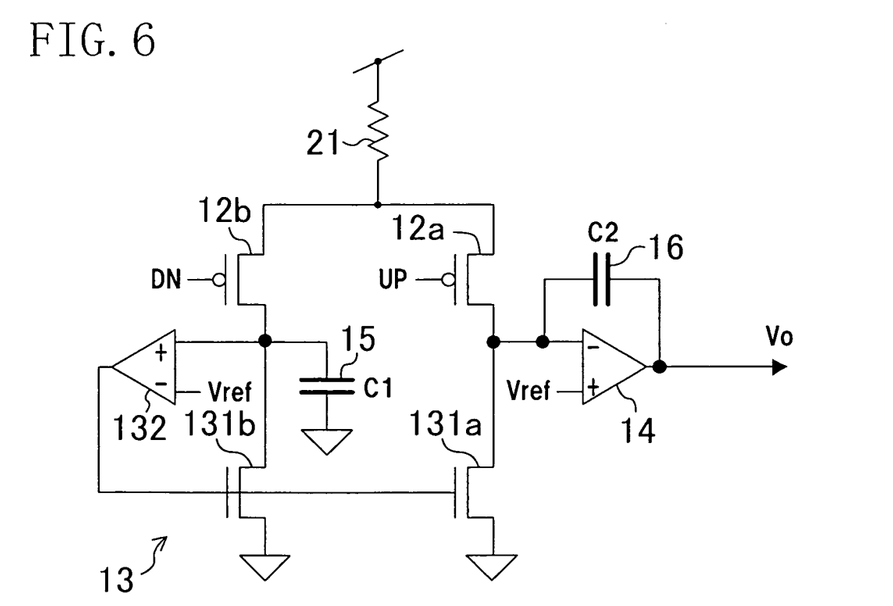
FIG. 6 is a view showing a configuration of a charge pump circuit of Embodiment 4 of the present invention.

FIG. 6 shows a configuration of a charge pump circuit of Embodiment 4 of the present invention. The charge pump circuit of this embodiment includes a resistance 21 in place of the current source 11 in the charge pump circuit of Embodiment 3 (see FIG. 5).

The operational amplifiers 132 and 14 receive the reference voltage Vref. Therefore, by setting the reference voltage Vref at a value lower than the power supply voltage, a current is drawn in from the power supply node via the switches 12a and 12b without specifically providing a current source.

In this embodiment, therefore, with no current source being necessary, the circuit scale can be furthermore reduced. Note that if it is assumed that both the signals UP and DN can be active simultaneously, a resistance may be placed for each of the switches 12a and 12b.

In the above description, the switches 12a and 12b are both made of a p-channel transistor. The present invention is not limited to this, but the switching of switches made of an n-channel transistor may be controlled with the signals UP and DN. Naturally, in this case, the current mirror circuit should be composed of p-channel transistors. Thus, the effect of the present invention will not be lost even when an attribute of the transistors constituting the switches and the current mirror circuit is changed.

As described above, the charge pump circuit of the present invention can keep the charge formed with the push operation and the charge released with the pull operation in equilibrium, and thus is useful as charge pump circuits for PLL circuits and DLL circuits in which such equilibrium is particularly required.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A charge pump circuit for performing push-pull operation based on first and second control signals, comprising:
   a first switch controlled by the first control signal;
   a second switch controlled by the second control signal, the first and second switches include one type of channel transistor having substantially identical characteristics;
   a first current source connected to a source of the first switch;
   a second current source connected to a source of the second switch;
   a current mirror circuit whose input is connected to a drain of the second switch and whose output is connected to a drain of the first switch, the current mirror circuit being inputted with a current flowing through the second switch, the current mirror circuit comprising a first transistor having a first source, first drain and first gate and a second transistor having a second source, second drain and second gate, the first drain being connected to the output of the current mirror circuit and the second drain being connected to the input of the current mirror circuit, and the first gate and the second gate being connected;

a first operational amplifier whose inverted input terminal is connected to the drain of the first switch and whose non-inverted input terminal is connected to the drain of the second switch;

a first capacitance having a first terminal and a second terminal, inserted on a negative feedback route of the first operational amplifier, the first terminal being connected to output of the first operational amplifier and the second terminal being connected to the inverted input terminal of the first operational amplifier; and a second operational amplifier by which the first and second gates are connected, the second operational amplifier having an inverted input terminal for receiving a reference voltage and a non-inverted input terminal for receiving a voltage at the input side of the current mirror circuit, wherein:

either one of the push operation and pull operation is performed with a current flowing through the first switch, and the other operation is performed with an output current of the current mirror circuit, an output of the second operational amplifier is connected to the first and second gates, and the first current source, the first switch and the current mirror circuit are connected in series, and the second current source, the second switch and the current mirror circuit are connected in series.

2. The circuit of claim 1, further comprising:

a second capacitance having a first terminal connected to the input side of the current mirror circuit and a second terminal, the second capacitance having the same capacitance value as the first capacitance.

3. A charge pump circuit for performing push-pull operation based on first and second control signals, comprising:

a first switch controlled by the first control signal;

a second switch controlled by the second control signal, the first and second switches include one type of channel transistor having substantially identical characteristics, the first and second control signals being different in phase from each other;

a current source commonly connected to sources of the first and second switches;

a current mirror circuit whose input is connected to a drain of the second switch and whose output is connected to a drain of the first switch, the current mirror being inputted with a current flowing through the second switch, the current mirror circuit comprising a first transistor having a first source, a first drain and a first gate and a second transistor having a second source, a second drain and a second gate, the first drain being connected to the output of the current mirror circuit and the second drain being connected to the input of the current mirror circuit, and the first gate and the second gate being connected;

first operational amplifier whose inverted input terminal is connected to the drain of the first switch and whose non-inverted input terminal is connected to the drain of the second switch;

a first capacitance having a first terminal and a second terminal, inserted on a negative feedback route of the first operational amplifier, the first terminal being connected to output of the first operational amplifier and the second terminal being connected to the inverted input terminal of the first operational amplifier; and a second operational amplifier by which the first and second gates are connected, the second operational amplifier having an inverted input terminal for receiving a reference voltage and a non-inverted input terminal for receiving a voltage at the input side of the current mirror circuit, wherein:

either one of the push operation and pull operation is performed with a current flowing through the first switch, and the other operation is performed with an output current of the current mirror circuit, an output of the second operational amplifier is connected to the first and second gates, and the current source, the first switch and the current mirror circuit are connected in series, and the current source, the second switch and the current mirror circuit are connected in series.

* * * * *